United States Patent
Ding et al.

(10) Patent No.: US 12,322,054 B2
(45) Date of Patent: Jun. 3, 2025

(54) AR AND DEEP LEARNING INTERSECTION SHIP ROUTE PREDICTOR

(71) Applicant: INTERNATIONAL BUSINESS MACHINES CORPORATION, Armonk, NY (US)

(72) Inventors: Yuan Yuan Ding, Shanghai (CN); Nuo Xu, Hangzhou (CN); Yang Liu, Zhong Xin (CN); Ke Yong Zhang, Shanghai (CN); Hong Bing Zhang, Beijing (CN); Tian Tian Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 18/314,893

(22) Filed: May 10, 2023

(65) Prior Publication Data

US 2024/0378818 A1   Nov. 14, 2024

(51) Int. Cl.
  *G06T 19/00*   (2011.01)
  *G06V 10/82*   (2022.01)
  *H04N 5/14*   (2006.01)
  *H04N 13/239*   (2018.01)

(52) U.S. Cl.
  CPC ............ *G06T 19/006* (2013.01); *G06V 10/82* (2022.01); *H04N 5/145* (2013.01); *H04N 13/239* (2018.05); *G06V 2201/07* (2022.01)

(58) Field of Classification Search
  None
  See application file for complete search history.

(56) References Cited

U.S. PATENT DOCUMENTS

| 11,104,334 B2 | 8/2021 | Yan |
| 2021/0116907 A1 | 4/2021 | Altman |

FOREIGN PATENT DOCUMENTS

| CN | 208836229 U | 5/2019 |
| CN | 108445879 B | 2/2021 |
| CN | 112985406 A | 6/2021 |
| CN | 109298708 B | 8/2021 |
| WO | 2013012280 A2 | 1/2013 |
| WO | 2021189210 A1 | 9/2021 |

OTHER PUBLICATIONS

Lu et al., "MoNet: Motion-Based Point Cloud Prediction Network", 2022. (Year: 2022).*

(Continued)

*Primary Examiner* — Nicholas R Wilson
(74) *Attorney, Agent, or Firm* — Teddi E. Maranzano (57) ABSTRACT

According to one embodiment, a method, computer system, and computer program product for predicting the movement intentions of ships is provided. The present invention may include obtaining binocular camera visual data of a body of water; identifying physical objects in the body of water; generating feature point clouds of the physical objects in the body of water; performing instance segmentation on the generated feature point clouds; analyzing the generated feature point clouds; predicting the movement intentions of identified ships in the body of water based on the analyzed feature point clouds; and displaying the predicted movement intentions of the identified ships in the body of water on an augmented reality device.

17 Claims, 7 Drawing Sheets

(56) References Cited

OTHER PUBLICATIONS

Didrik Grove, "Multi-Sensor Multi-Target Tracking Using LIDAR and Camera in a Harbor Environment", Jun. 2021. (Year: 2021).*
Pire et al., "Online Object Detection and Localization on Stereo Visual SLAM System", 2019. (Year: 2019).*
Chen, et al., "Ship Intention Prediction at Intersections Based on Vision and Bayesian Framework," Journal of Marien Science and Engineering [article], 2022, 17 pages, vol. 10, Issue 5, MDPI, DOI: 10.3390/jmse10050639, Retrieved from the Internet: <URL: https://www.mdpi.com/2077-1312/10/5/639>.
Cho, et al., "Probabilistic Intent Inference for Predicting the Compliance with COLREGs between Two Surface Ships," IFAC—PapersOnLine [journal], 2020, pp. 14595-14599, vol. 53, No. 2, ScienceDirect, DOI: 10.1016/j.ifacol.2020.12.1467, Retrieved from the Internet: <URL: https://www.sciencedirect.com/science/article/pii/S2405896320318796>.
Ma, et al., "Intent prediction of vessels in intersection waterway based on learning vessel motion patterns with early observations," Ocean Engineering [journal], 2021, 14 pages, vol. 232, DOI: 10.1016/j.oceaneng.2021.109154, Retrieved from the Internet: <URL: https://www.sciencedirect.com/science/article/abs/pii/S0029801821005874>.
Templin, et al., "Using Augmented and Virtual Reality (AR/VR) to Support Safe Navigation on Inland and Coastal Water Zones," remote sensing [article], 2022, 23 pages, vol. 14, MDPI, DOI: 10.3390/rs14061520, Retrieved from the Internet: <URL: https://www.mdpi.com/2072-4292/14/6/1520>.

* cited by examiner

AR AND DEEP LEARNING INTERSECTION SHIP ROUTE PREDICTOR

BACKGROUND

The present invention relates, generally, to the field of computing, and more particularly to augmented reality.

Augmented reality (AR) is a technology that uses software to overlay virtual information onto a physical environment to provide a person with an enhanced experience. Augmented reality creates a real-time interactive experience by displaying a visual, auditory, and/or other sensory information onto a real-world environment. Currently, augmented reality can be used to identify and track the movements of ground vehicles. However, maritime vehicles, for example ships, cannot perform the same maneuvers as ground vehicles, such as sudden stops, quick turns, or reversals, and also have their movements impacted by environmental conditions, such as winds and currents. Therefore, in order for true optimization of augmented reality, a method and system by which augmented reality can be used to identify and predict the movements of maritime vehicles, are needed. Thus, an improvement in augmented reality has the potential to benefit drivers of maritime vehicles and maritime navigation safety by providing the ability to both track and see the current and potential movements of the maritime vehicles in a body of water.

SUMMARY

Embodiments of a method, a computer system, and a computer program product are described. According to one embodiment, a method, computer system, and computer program product for predicting the movement intentions of ships is provided. The present invention may include obtaining binocular camera visual data of a body of water; identifying physical objects in the body of water; generating feature point clouds of the physical objects in the body of water; performing instance segmentation on the generated feature point clouds; analyzing the generated feature point clouds; predicting the movement intentions of identified ships in the body of water based on the analyzed feature point clouds; and displaying the predicted movement intentions of the identified ships in the body of water on an augmented reality device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the open water, it may be highly likely that there are frequent interactions and trajectory conflicts between ships. Moreover, these frequent interactions and trajectory conflicts may be even more common in confined waters, such as intersection channels. It can be a particularly challenging task to safely navigate the passage of ships through the confined spaces because of the inability to correctly identify and predict the movement intentions of other ships sailing in the same confined spaces. Therefore, drivers of maritime vehicles and maritime navigation safety may be hindered by a lack of a method in which the movement intentions of other ships are accurately predicted. As a result, drivers of maritime vehicles may be provided with inaccurate data and may end up compromising the safety of the passengers, putting them and the ship in danger, or traveling on an inefficient passage through a channel.

One way in which current methods attempt to address problems with safely navigating ships through confined spaces, is by using Automatic Identification System ("AIS") data to identify the intentions of ships. AIS data comprises the type of ship, the name of the ship, the latitude and longitude location of the ship, etc. AIS is used to identify and track the ships, and to avoid ship collisions. However, the process of using AIS data contains a time-delay problem. The total reporting frequency varies greatly and is not uniform, leading to missed movements of a ship, and thus, inaccurate and ineffective data. It is important that the movements of ships are dynamically tracked and reported so that timely measures may be taken to avoid conflicts. Thus, an improvement in AR has the potential to benefit drivers of maritime vehicles and thus, maritime navigation safety, by providing the ability to both track and see the current and potential movements of the maritime vehicles in a body of water.

The present invention has the capacity to improve maritime navigation safety by dynamically identifying and predicting the movement intentions of ships in a confined area. The present invention can process live video using binocular simultaneous localization and mapping ("SLAM") and can both predict and display the movements of ships in a body of water, such as an intersection channel, based on deep learning algorithms. This improvement in maritime navigation safety can be accomplished by implementing a system that records live video of a body of water using binocular cameras, processes the recorded live video of the body of water using binocular simultaneous localization and mapping, targets six degrees of freedom ("6DOF") movements of identified ships in the body of water, predicts movement intentions of the identified ships, and displays the predicted movement intentions of the identified ships.

In some embodiments of the invention, the AR ship route determination code, "the program", can record live video of a body of water using two cameras. The two cameras can be placed at the bow of a ship and can be placed in a stereo format. The distance and angles between the two cameras can be adjustable, allowing the cameras to both capture more depth information about a body of water and to be set up on various boats. A body of water may be a ship intersection, ship channel, or any other body of water wherein multiple ships travel. The camera device(s) can capture the physical objects in the body of water, such as ships, buildings, and bodies of water, and the depth information of the body of water, such as the location and distance of the physical objects from the ship comprising the stereo cameras, otherwise referred to as the origin ship. Additionally, the program can use inertial measurement unit ("IMU") sensor(s) to detect the speed, force, rotation, and orientation of a physical object.

The program can process the recorded live video using SLAM. More specifically, the program can use ORB-SLAM3 algorithms to perform visual, visual-inertial, and multi-map SLAM with stereo cameras. The program can identify the physical objects in the recorded live video using object recognition. The program can use the SLAM algorithm to dynamically generate feature point clouds using the fused data from the cameras and then IMU sensor(s). The generated featured point clouds can represent the three-dimensional information of each physical object, such as the type of physical object and the size of the object. The program can perform instance segmentation using binocular SLAM. The SLAM algorithm can mark the generated feature point clouds as different colors to classify the physical objects into different groupings.

The program can use an optimization algorithm to analyze the feature point clouds of the ships in the body of water. The program can use the analyzed feature point clouds to determine how each ship in the body of water is moving through three-dimensional space, such as the position of the ships, their direction, speed, and rotation.

The program can predict the movement intention of the identified ships. The movement intention can comprise the program's prediction of a ship's two-dimensional movements in a body of water and can be based on the current position of a ship, the ship's speed, the ship's acceleration, and the ship's turning angle. The program's prediction of a ship's movement can comprise future positions of the ship in the body of water and also the path the ship will travel along. The program can establish a two-dimensional coordinate system using the targeted 6DOF of the ships in the body of water. The program can use the two-dimensional coordinate system to ascertain the movement parameters of each ship in the body of water, such as the x-coordinates, y-coordinates, velocity, and turning angle. The movement parameters can be represented in a data vector, for example, <x, y, velocity, angle>.

The program can train a neural network, more specifically, an attention-RNN model, to predict the movement intentions of identified ships. The program can input obtained data vectors into the neural network to train the attention-RNN model. The attention-RNN model may comprise a backbone network composed of a long-short-term memory hidden layer ("LSTM"), an attention layer, and a multilayer perceptron layer ("MLP"). The program can train the attention-RNN model by collecting movement parameter datasets of ships using captured and binocular SLAM-processed video and using the movement parameter datasets as training datasets. Captured videos may comprise random, normal, or specific movement(s), or movement patterns, of one or more ships. For example, the model can be fed processed videos comprising three ships traveling parallel to each other, four ships turning left along the same direction, three ships turning right along the same direction, ships traveling in opposite directions, etc.

The program can chronologically input data vectors into the attention-RNN model. The program can produce a data vector every 0.1 seconds, meaning that there are ten data vectors in a second. The data is fed through a long-short-term memory hidden layer ("LSTM") to generate a set of hidden states, one per time-step. The program can feed the sets of hidden states through an Attention Layer to generate an output feature vector. The program can feed each output feature vector from the attention layer through an MLP to produce an output vector, for example, <x, y, velocity, angle>. The output of the MLP can be a 4-dimensional data vector that represents a predicted movement intention of a ship. The program can predict the movement of a ship based on the output of the attention-RNN model. In some embodiments of the invention, the program may dynamically use an auto-augmentation network to improve the accuracy of the attention-RNN model by continuously feeding more data parameters into the neural network.

The program can display the predicted movement intentions of the identified ships on an AR device. The program can render an augmented reality simulated environment. The AR simulated environment, also referred to as "the AR environment", may be a hybrid environment comprising both physical and virtual elements. The program may accurately register and display both physical and virtual objects within the physical environment, such that virtual elements are anchored to a physical location. The AR environment may comprise a hybrid physical/virtual world in which one or more users may enter, see, move around in, interact with, etc. through the medium of an AR device. The AR environment may comprise an environment wherein generated images, sounds, haptic feedback, and other sensations are integrated into a real-world environment.

The program can display the predicted movement intentions of the identified ships on the AR device using text and arrows, for example, to indicate direction. The program can display the speed, distance, turning angle, etc., of other ships from the origin ship's point of view, meaning from the point of view of the ship comprising the stereo cameras. In some embodiments of the invention, the program may display an optimal route for the origin ship through the intersection. The program may plan an optimal route for the origin ship based on the predicted movement intentions of the other ships in proximity to the origin ship.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to record live video of a body of water, process the recorded live video of the body of water using binocular simultaneous localization and mapping, target six degrees of freedom movements of identified ships in the body of water, predict movement intentions of the identified ships, and display the predicted movement intentions of the identified ships.

Figure 1:
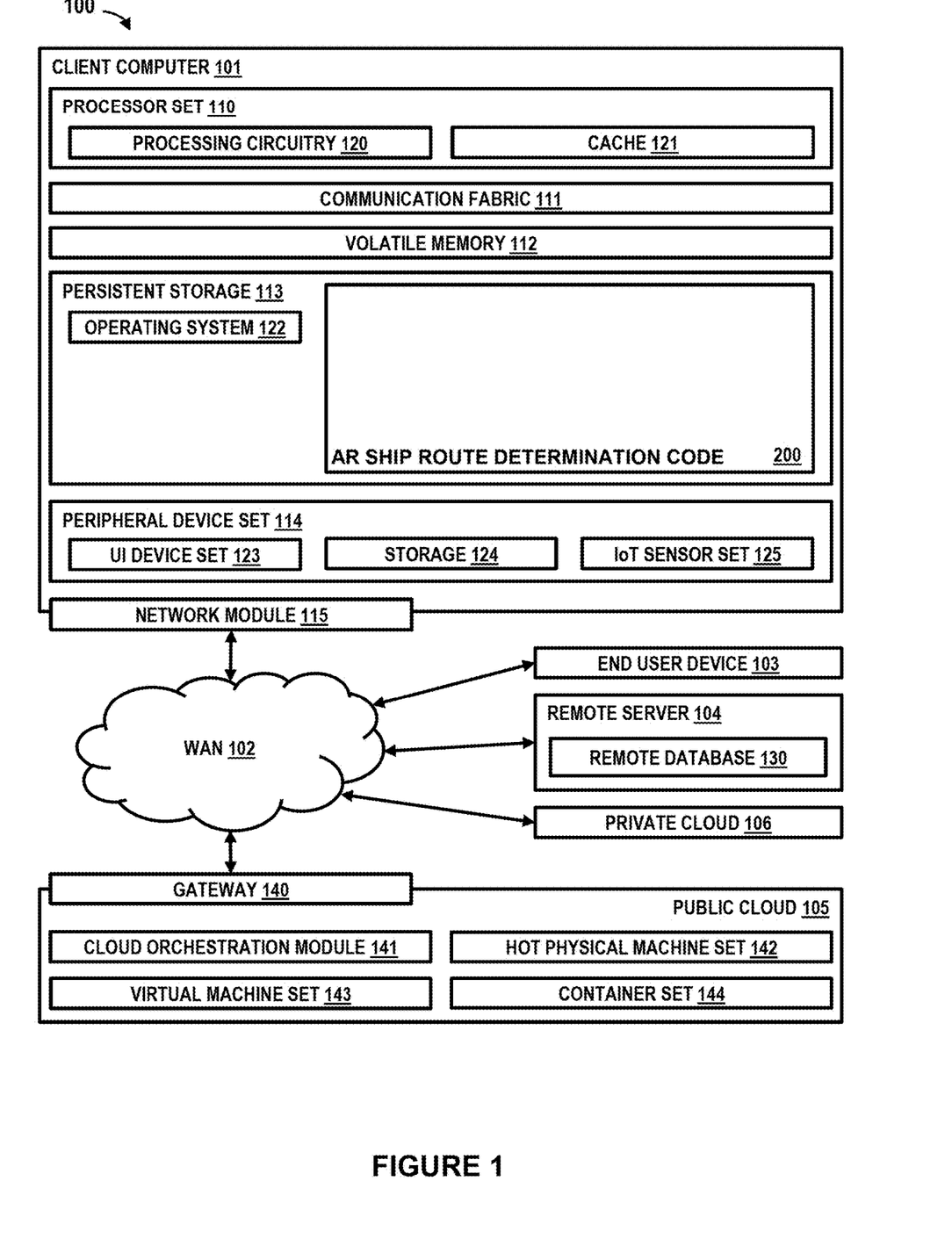
FIG. 1 illustrates an exemplary networked computer environment according to at least one embodiment.

Referring to FIG. 1, an exemplary networked computer environment 100 is depicted, according to at least one embodiment. Computing environment 100 contains an example of an environment for the execution of at least some of the computer code involved in performing the inventive methods, such as AR ship route determination code 200. In addition to code block 200 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
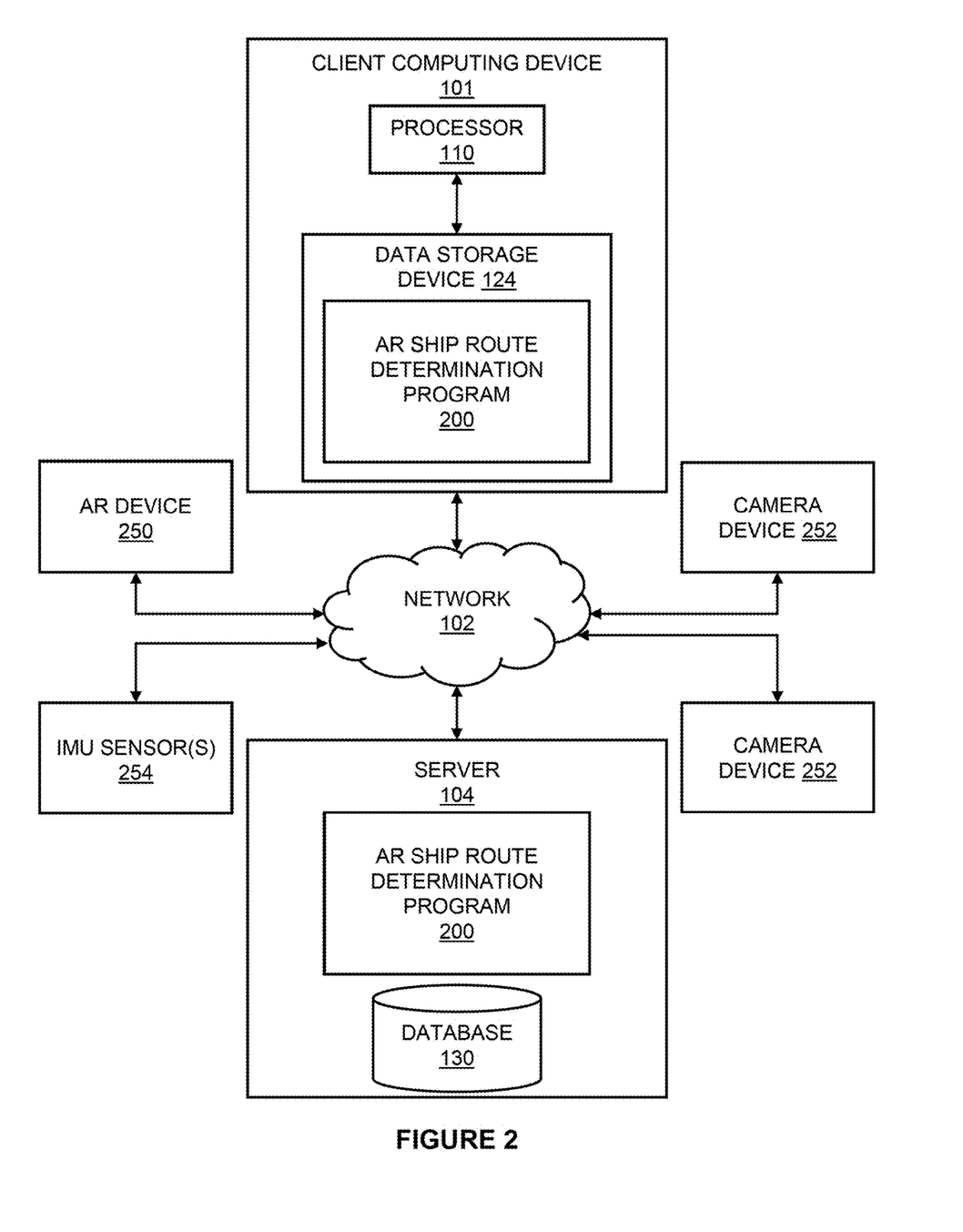
FIG. 2 illustrates an exemplary application invention environment according to at least one embodiment.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run an AR ship route determination program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running an AR ship route determination program 200 and a database 130 and communicating with the client computing device 101 via the communication network 102, in accordance with embodiments of the invention. The remote server 104 may also operate in a cloud computing service model, such as Software as a Service (Saas), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can store captured videos. The database 130 can store data related to the predicted movements of ships. Additionally, the database 130 can comprise the attention-RNN model and the training data used to train the model. The database 130 can comprise an auto-augmentation network. Also, the database 130 can comprise data related to the SLAM algorithm. The database 130 can comprise a knowledge corpus. The knowledge corpus may comprise information relating to previously used camera devices 252 and IMU sensors 254. The knowledge corpus may be updated based on the camera devices 252 and IMU sensors 254 used continuous predicting of the movements of ships. Also, the knowledge corpus may comprise information relating to object recognition. Additionally, the database 130 may comprise previously identified physical objects.

Augmented reality (AR) device 250 may be any device or combination of devices enabled to record real-world information that the AR module 406 may overlay with computer-generated perceptual elements to create an AR environment. The AR device 250 can display an AR-simulated environment to a user and allow the user to interact with the AR environment. The AR device 250 can be a headset. Also, the AR device 250 can comprise a head-mounted display (HMD). Additionally, the AR device 250 may be equipped with or comprise a number of sensors, such as a camera, microphone, and accelerometer, and these sensors may be equipped with or comprise a number of user interface devices such as touchscreens, speakers. etc.

Camera device(s) 252 may be any device capable of continuously capturing the depth information of a physical object. The camera device(s) 252 can comprise cameras, such as any device capable of recording visual images in the form of photographs, films, or video signals, such as a physical or virtual camera.

Inertial measurement unit ("IMU") sensor(s) 254 may be any device capable of measuring the speed, force, rotation, and orientation of a physical object, such as inertial measurement units, accelerometers, gyroscopes, magnetometers, proximity sensors, pressure sensors, etc.

According to the present embodiment, the AR ship route determination code 200, "the program", may be a program capable of recording a live video of a body of water, processing the live video using binocular SLAM, targeting the 6 degrees of freedom movements of the ships in the body of water, predicting the movement intentions of the ships in the body of water, and displaying the predicted movement intentions of the ships in the body of water on an augmented reality device. The program 200 may be located on client computing device 101 or remote server 104 or on any other device located within network 102. Furthermore, the program 200 may be distributed in its operation over multiple devices, such as client computing device 101 and remote server 104. The AR ship route determination method is explained in further detail below with respect to FIG. 3.

Figure 3:
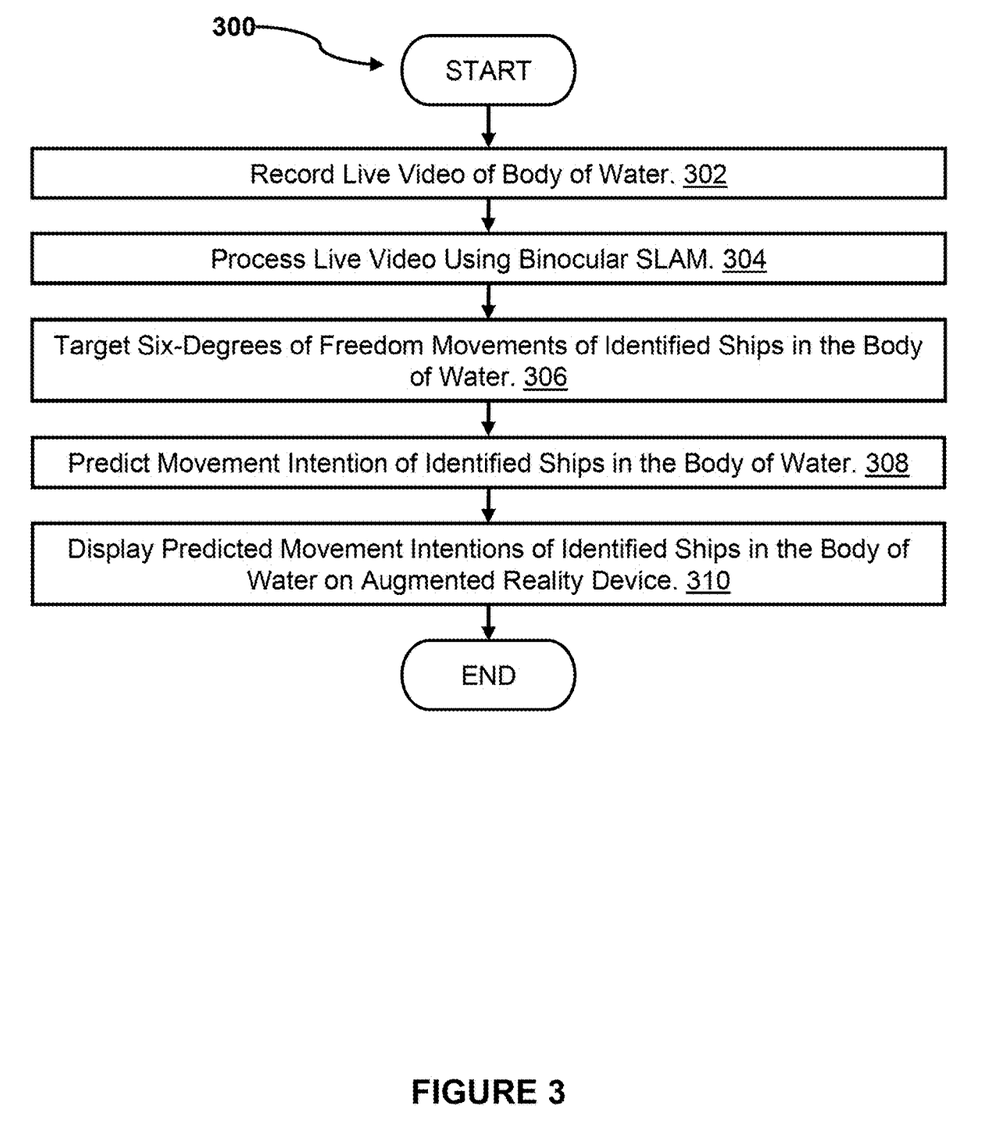
FIG. 3 is an operational flowchart illustrating an AR ship route determination process according to at least one embodiment.
Figure 5:
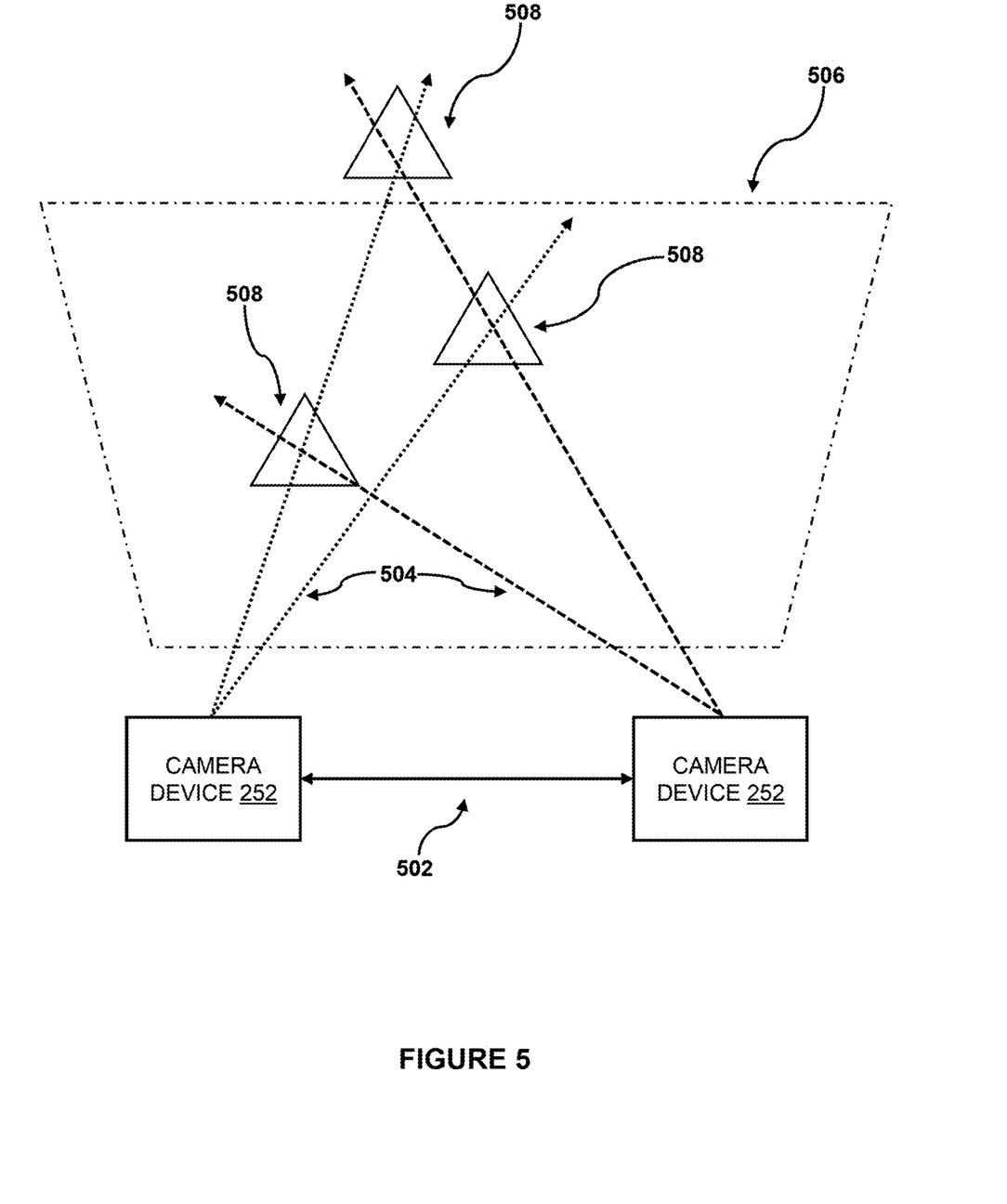
FIG. 5 depicts a visual representation of a stereo camera bow setup and recording process according to at least one embodiment.

Referring now to FIG. 3, an operational flowchart illustrating an AR ship route determination process 300 is depicted according to at least one embodiment. At 302, the program 200 records live video of a body of water. The program 200 can record live video using two cameras, such as camera devices 252 of FIG. 5. The two cameras 252 can be placed along a baseline 502 at the bow of a ship and can be placed in a stereo format. The distance and angles between the two cameras 252, such as indicated by lines of sight 504, can be adjustable, allowing the cameras 252 to both capture more depth information about a body of water and to be set up on various boats. An optimal depth region 506 is determined by triangulating a 3D scene point from the observed 2D projections of the scene point by ray intersection of the viewing rays along the lines of sight 504 from the stereo cameras 252. A body of water may be a ship intersection, ship channel, or any other body of water wherein multiple ships travel. The camera device(s) 252 can capture the physical objects in the body of water, such as ships 508, buildings, and bodies of water, and the depth information of the body of water, such as the location and distance of the physical objects from the origin ship. Additionally, the program 200 can use inertial measurement unit ("IMU") sensor(s) to detect the speed, force, rotation, and orientation of a physical object.

Figure 6:
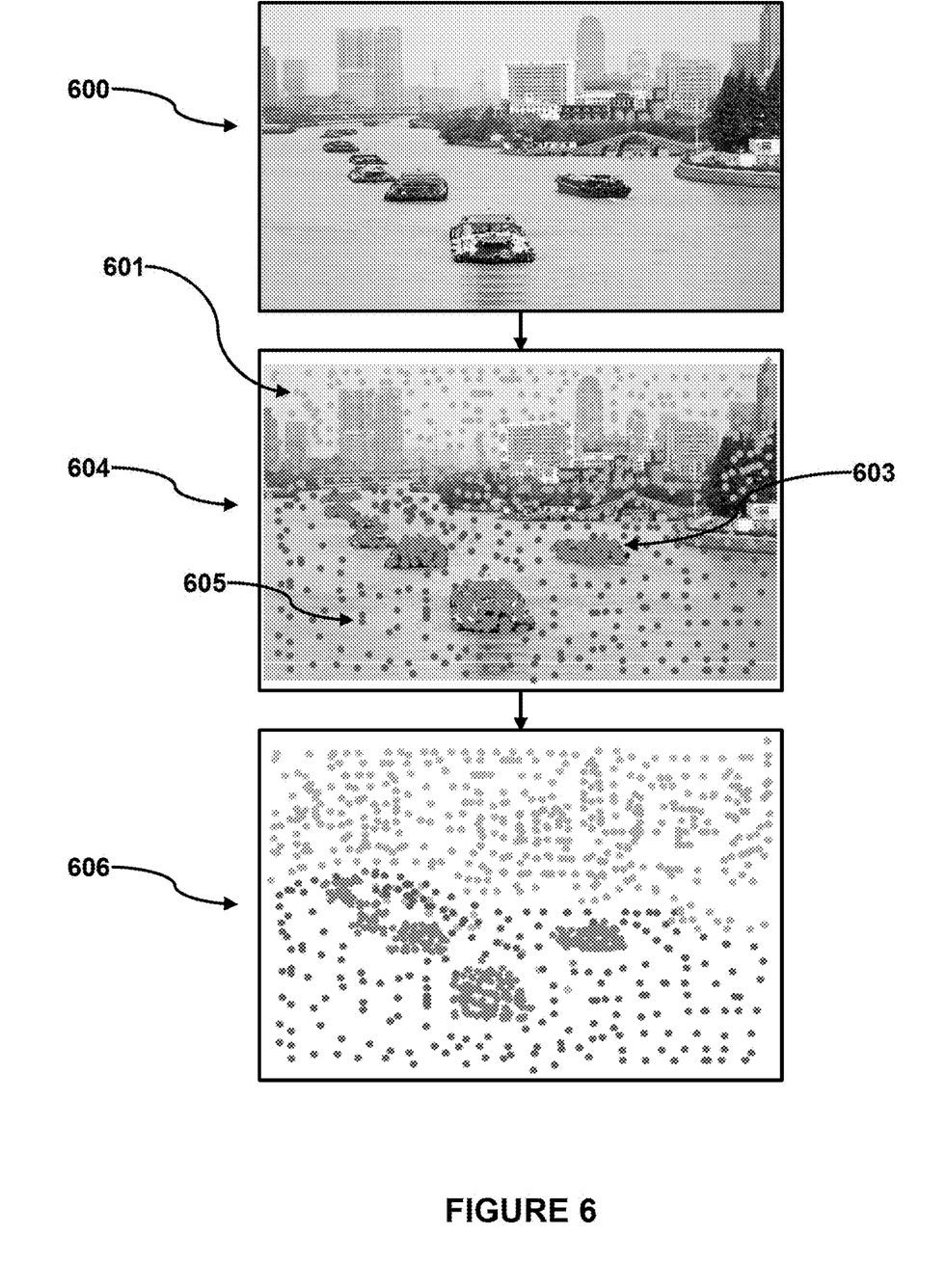
FIG. 6 depicts a visual representation of a SLAM processing method according to at least one embodiment.

At 304, the program 200 processes the recorded live video 600 using binocular SLAM. More specifically, the program 200 can use ORB-SLAM3 algorithms to perform visual, visual-inertial, and multi-map SLAM with stereo cameras, such as camera devices 252. The program 200 can identify the physical objects in the recorded live video, for example in the captured visual data 602, using object recognition. The program 200 can use the SLAM algorithm to dynamically generate feature point clouds, such as shown in FIG. 6, using the fused data from the stereo cameras 252 and the IMU sensor(s) 254. The generated featured point clouds can represent the three-dimensional information of each physical object, such as the type of physical object and the size of the object.

The program 200 can perform instance segmentation using binocular SLAM. The SLAM algorithm can mark the generated feature point clouds as different colors to classify the physical objects into different groupings (604 of FIG. 6), (601 of FIG. 6), (603 of FIG. 6), (605 of FIG. 6), and (606 of FIG. 6). For example, the program 200 can mark the feature point clouds of ships as red, feature point clouds of rivers as green, feature point clouds of a shore as blue, and feature point clouds of the sky as yellow.

At 306, the program 200 can target the 6DOF movements of each ship in the body of water. The program 200 can capture the 6DOF movements of each ship in the body of water using optimization algorithms, such as VOLO. The program 200 can use the optimization algorithm to analyze the feature point clouds of the ships in the body of water, for example, only the red feature point clouds. The program 200 can use the analyzed feature point clouds, 605 in FIG. 6, to determine how each ship in the body of water is moving through the body of water, such as the position of the ships, their direction, speed, and rotation.

Figure 7:
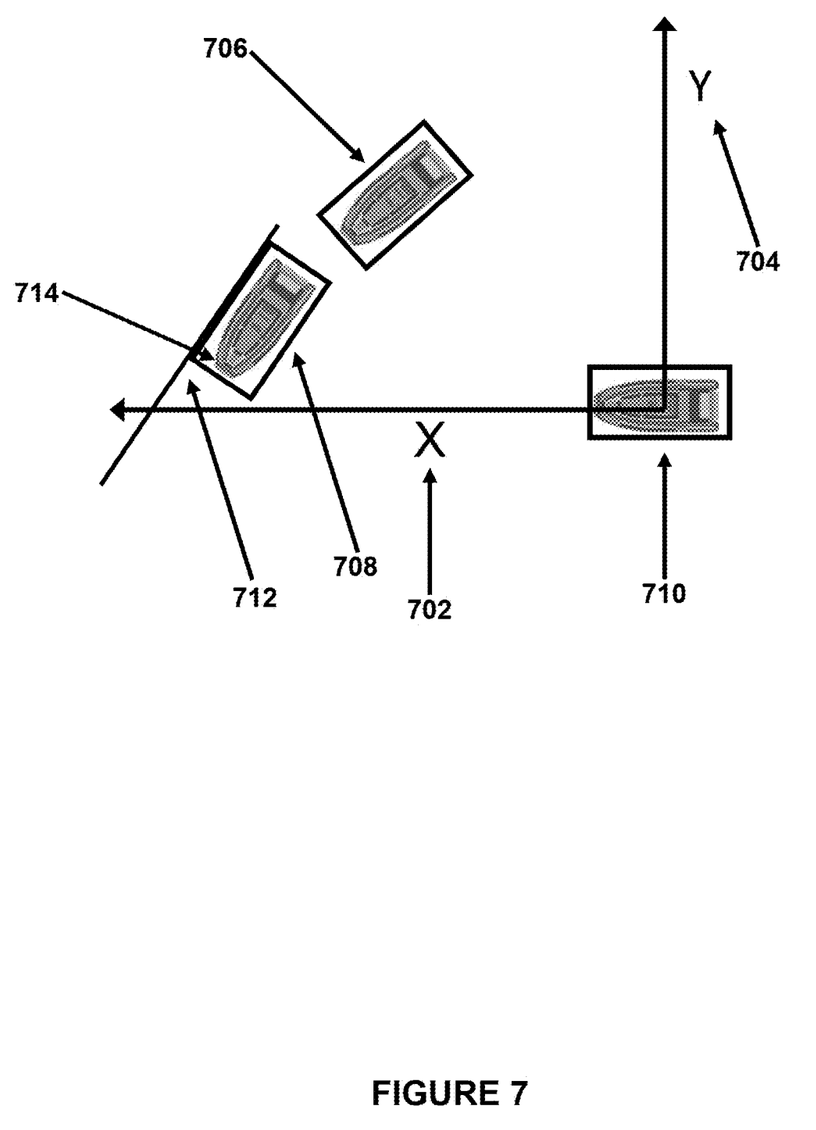
FIG. 7 depicts a visual representation of an intention prediction two-dimensional coordinate system according to at least one embodiment.

At 308, the program 200 predicts the movement intention of the identified ships. The movement intention can comprise the program's 200 predictions of a ship's movement in a three-dimensional space and can be based on the current position of a ship, the ship's speed, the ship's acceleration, and the ship's turning angle. The program's 200 prediction of a ship's movement can comprise future positions of the ship in the body of water and also the path the ship will travel along. The program 200 can establish a two-dimensional coordinate system, such as shown in FIG. 7, using the targeted 6DOF of the ships in the body of water from the point of view of the origin ship 710. The program 200 can use the two-dimensional coordinate system to ascertain the movement parameters of ship 1 706, 708 in the body of water, such as the x-coordinates 702, y-coordinates 704, velocity 712, and turning angle 710, based on the positions, speed, acceleration, and turning angle of ship 1, at time point 1 706 and time point 2 708. The movement parameters can be represented in a data vector, for example, <x, y, velocity, angle>.

The program 200 can train a neural network, more specifically, an attention-RNN model, to predict the movement intentions of identified ships. The program 200 can input obtained data vectors into the neural network to train the attention-RNN model. The attention-RNN model may comprise a backbone network composed of a long-short-term memory hidden layer ("LSTM"), an attention layer, and a multilayer perceptron layer ("MLP"). The program 200 can train the attention-RNN model by collecting movement parameter datasets of ships using captured and binocular SLAM-processed video and using the movement parameter datasets as training datasets. Captured videos may comprise random, normal, or specific movement(s), or movement patterns, of one or more ships. For example, the model can be fed processed videos comprising three ships traveling parallel to each other, four ships turning left along the same direction, three ships turning right along the same direction, ships traveling in opposite directions, etc.

The program 200 can chronologically input the data vectors into the attention-RNN model. The program 200 can produce a data vector every 0.1 seconds, meaning that there are ten data vectors in a second. The data is fed through a long-short-term memory hidden layer ("LSTM") to generate a set of hidden states, one per time-step. Hidden states can be calculated using the following formula:

$$f(x_i, y) = (W_1 * x_i, W_2 * y)$$

$W_1$ and $W_2$ can be the parameters learned from the training data; $x_i$ can be the input data vector; and y can be the output of the model.

The program 200 can feed the sets of hidden states through an Attention Layer to generate an output feature vector. Output feature vectors can be calculated using the following formula:

$$\text{Attention Layer} = \sum\nolimits_{i=1}^{n} \text{softmax}(f(x_i, y)) * x_i$$

The program 200 can feed each output feature vector from the attention layer through an MLP to produce an output vector, for example, <x, y, velocity, angle>. The output of the MLP can be a 4-dimensional data vector that represents a predicted movement intention of a ship. The program 200 can predict the movement of a ship based on the output of the attention-RNN model.

In some embodiments of the invention, the program 200 may dynamically use an auto-augmentation network to improve the accuracy of the attention-RNN model by continuously feeding more data parameters into the neural network.

At 310, the program 200 displays the predicted movement intentions of the identified ships on an AR device 250. The program 200 can render an augmented reality simulated environment. The AR simulated environment, herein referred to as "the AR environment", may be a hybrid environment comprising both physical and virtual elements. The program may accurately register and display both physical and virtual objects within the physical environment, such that virtual elements are anchored to a physical location. The AR environment may comprise a hybrid physical/virtual world in which one or more users may enter, see, move around in, interact with, etc. through the medium of an AR device. The AR environment may comprise an environment wherein generated images, sounds, haptic feedback, and other sensations are integrated into a real-world environment.

The program 200 can display the predicted movement intentions of the identified ships on the AR device 250 using text and arrows, for example, to indicate direction. The program 200 can display the speed, distance, turning angle, etc., of other ships from the origin ship's point of view, meaning from the point of view of the ship comprising the stereo cameras. In some embodiments of the invention, the program 200 may display an optimal route for the origin ship through the intersection. The program 200 may plan an optimal route for the origin ship based on the predicted movement intentions of the other ships in proximity to the origin ship. For example, the program 200 may redirect the origin ship on a route in which the origin ship, at its current speed, distance, and acceleration, can travel through the body of water while avoiding contact with the other ships in its proximity.

Figure 4:
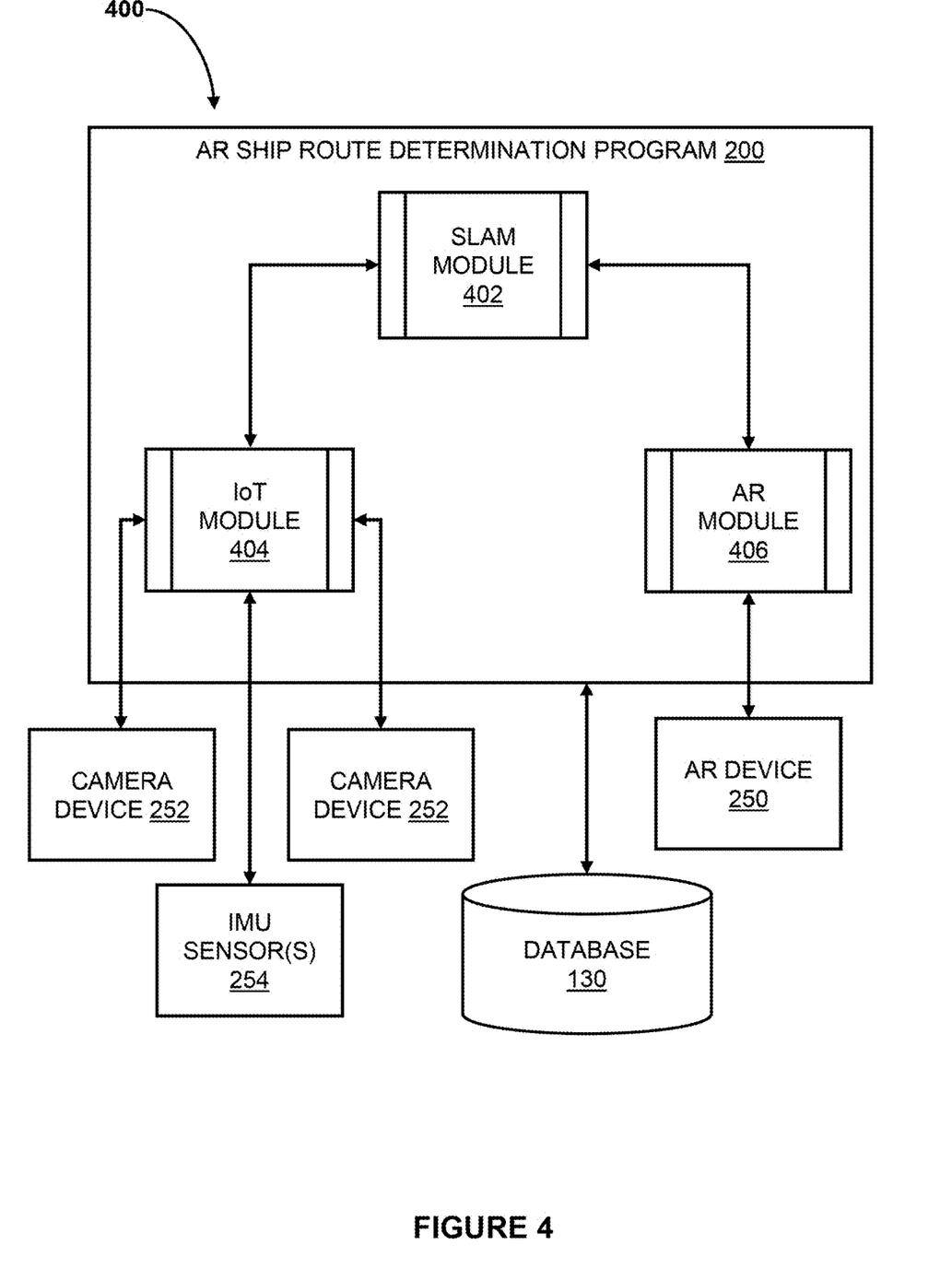
FIG. 4 is a system diagram illustrating an exemplary program environment of an implementation of an AR ship route determination process according to at least one embodiment.

Referring now to FIG. 4, a system diagram illustrating an exemplary program environment 400 of an implementation of an AR ship route determination process 300 is depicted according to at least one embodiment. Here, the program 200 comprises a SLAM module 402, an IoT module 404, and an AR module 406. The exemplary program environment 400 details the interactions between the SLAM module 402 and the IoT module 404, and the SLAM module 402 and the AR module 406. Additionally, the exemplary program environment 400 details the interactions between the AR module 406 and the AR device 250, the IoT module 404 and the camera device(s) 252, the IoT module 404 and the IMU sensor(s) 254, and the AR ship route determination program 200 and the database 130.

The SLAM module 402 may be used to perform binocular SLAM. The IoT module 404 may be used to communicate with the camera device(s) 252 and the IMU sensor(s) 254. The AR module 406 may be used to display an AR environment and AR objects.

It may be appreciated that FIGS. 2 through 7 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for predicting movement intentions of ships, the method comprising:
    obtaining binocular camera visual data of a body of water;
    identifying physical objects in the body of water;
    generating feature point clouds of the physical objects in the body of water;
    performing instance segmentation on the generated feature point clouds;
    analyzing the generated feature point clouds;
    predicting the movement intentions of identified ships in the body of water based on the analyzed generated feature point clouds;
    determining an optimal route for an origin ship to travel along based on the movement intentions of the identified ships in the body of water;
    displaying the optimal route for the origin ship on an augmented reality device; and
    displaying the predicted movement intentions of the identified ships in the body of water on the augmented reality device.

2. The method of claim 1, wherein the generating of the feature point clouds and the performing of the instance segmentation on the generated feature point clouds comprises using binocular simultaneous localization and mapping.

3. The method of claim 1, wherein the obtaining binocular camera visual data of a body of water comprises using two cameras in a stereo format set up on an origin ship.

4. The method of claim 3, wherein the obtaining binocular camera visual data of a body of water comprises using one or more inertial measurement unit sensors.

5. The method of claim 1, wherein the predicting of the movement intentions of the identified ships in the body of water based on the analyzed generated feature point clouds is performed using a trained attention-RNN model.

6. The method of claim 1, further comprising:
    training an attention-RNN model.

7. A computer system for predicting movement intentions of ships, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    obtaining binocular camera visual data of a body of water;
    identifying physical objects in the body of water;
    generating feature point clouds of the physical objects in the body of water;
    performing instance segmentation on the generated feature point clouds;
    analyzing the generated feature point clouds;
    predicting the movement intentions of identified ships in the body of water based on the analyzed generated feature point clouds;
    determining an optimal route for an origin ship to travel along based on the movement intentions of the identified ships in the body of water;
    displaying the optimal route for the origin ship on an augmented reality device; and
    displaying the predicted movement intentions of the identified ships in the body of water on the augmented reality device.

8. The computer system of claim 7, wherein the generating of the feature point clouds and the performing of the instance segmentation on the generated feature point clouds comprises using binocular simultaneous localization and mapping.

9. The computer system of claim 7, wherein the obtaining binocular camera visual data of a body of water comprises using two cameras in a stereo format set up on an origin ship.

10. The computer system of claim 9, wherein the obtaining binocular camera visual data of a body of water comprises using one or more inertial measurement unit sensors.

11. The computer system of claim 7, wherein the predicting of the movement intentions of the identified ships in the body of water based on the analyzed generated feature point clouds is performed using a trained attention-RNN model.

12. The computer system of claim 7, further comprising:
training an attention-RNN model.

13. A computer program product for predicting movement intentions of ships, the computer program product comprising:
one or more computer-readable tangible storage medium and program instructions stored on at least one of the one or more tangible storage medium, the program instructions executable by a processor to cause the processor to perform a method comprising:
obtaining binocular camera visual data of a body of water;
identifying physical objects in the body of water;
generating feature point clouds of the physical objects in the body of water;
performing instance segmentation on the generated feature point clouds;
analyzing the generated feature point clouds;
predicting the movement intentions of identified ships in the body of water based on the analyzed generated feature point clouds;
determining an optimal route for an origin ship to travel along based on the movement intentions of the identified ships in the body of water;
displaying the optimal route for the origin ship on an augmented reality device; and
displaying the predicted movement intentions of the identified ships in the body of water on the augmented reality device.

14. The computer program product of claim 13, wherein the generating of the feature point clouds and the performing of the instance segmentation on the generated feature point clouds comprises using binocular simultaneous localization and mapping.

15. The computer program product of claim 13, wherein the obtaining binocular camera visual data of a body of water comprises using two cameras in a stereo format set up on an origin ship.

16. The computer program product of claim 15, wherein the obtaining binocular camera visual data of a body of water comprises using one or more inertial measurement unit sensors.

17. The computer program product of claim 13, wherein the predicting of the movement intentions of the identified ships in the body of water based on the analyzed generated feature point clouds is performed using a trained attention RNN-model.

* * * * *